US008147370B2

(12) United States Patent
Nakajima et al.

(10) Patent No.: US 8,147,370 B2
(45) Date of Patent: Apr. 3, 2012

(54) POWER UNIT FOR MOTORCYCLE

(75) Inventors: Toshimitsu Nakajima, Saitama (JP);
Toshimasa Mitsubori, Saitama (JP);
Hitoshi Kondo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1163 days.

(21) Appl. No.: 11/984,951

(22) Filed: Nov. 26, 2007

(65) Prior Publication Data

US 2008/0161153 A1  Jul. 3, 2008

(30) Foreign Application Priority Data

Dec. 28, 2006 (JP) ................... 2006-356235

(51) Int. Cl.
*F16H 7/02* (2006.01)
(52) U.S. Cl. .................. 475/210; 474/28; 192/48.3
(58) Field of Classification Search .................. 475/210; 474/28
See application file for complete search history.

(56) References Cited

U.S. PATENT DOCUMENTS

| | | | | |
|---|---|---|---|---|
| 4,093,264 A | * | 6/1978 | Ishihara et al. | ............... 280/296 |
| 4,241,933 A | * | 12/1980 | Gratza et al. | ................. 180/219 |
| 6,692,388 B2 | * | 2/2004 | Nirasawa et al. | ............... 474/28 |
| 7,101,311 B2 | | 9/2006 | Deguchi | |
| 7,823,667 B2 | * | 11/2010 | Mitsubori et al. | ........... 180/54.1 |

FOREIGN PATENT DOCUMENTS

| | | |
|---|---|---|
| DE | 27 21 180 A1 | 11/1978 |
| DE | 10 2004 023 965 A1 | 4/2005 |
| EP | 0 184 675 A2 | 6/1986 |
| JP | 8-178014 A | 7/1996 |
| JP | 11-51147 A | 2/1999 |
| JP | 2000-73724 A | 3/2000 |
| JP | 2001-270481 A | 10/2001 |
| JP | 2005-42910 A | 2/2005 |

\* cited by examiner

*Primary Examiner* — David D Le
*Assistant Examiner* — Derek D Knight
(74) *Attorney, Agent, or Firm* — Birch, Stewart, Kolasch & Birch, LLP

(57) ABSTRACT

A power unit for a motorcycle having a continuously variable transmission, which is housed in a transmission chamber inside a engine body and which accomplishes stepless changes in the transmission of power from a drive pulley shaft to a driven pulley shaft by changing the effective diameter with which a belt actually wraps around each of the drive and the driven pulleys. An input clutch is set between a crankshaft and a drive pulley and is provided on the drive pulley shaft. A starter clutch is set between a driven pulley shaft and a rear wheel and is provided on the driven pulley shaft. The switching between the engagement and disengagement of one of the input clutch and the starter clutch is hydraulically controlled. Meanwhile, the switching between the engagement and disengagement of the other one of the input clutch and the starter clutch is mechanically controlled.

12 Claims, 10 Drawing Sheets

POWER UNIT FOR MOTORCYCLE

CROSS-REFERENCE TO RELATED APPLICATIONS

The present application claims priority under 35 USC 119 to Japanese Patent Application No. 2006-356235 filed on Dec. 28, 2006 the entire contents thereof is hereby incorporated by reference.

BACKGROUND OF THE INVENTION

1. Field of the Invention

The present invention relates to a power unit for a motorcycle. In the power unit, a continuously variable transmission is housed in a transmission chamber of an engine body. The continuously variable transmission includes a drive pulley provided on a drive pulley shaft, to which the torque is transmitted from a crankshaft, a driven pulley provided on the driven pulley shaft with its axis being parallel to the drive pulley shaft and a belt looped between the drive pulley and the driven pulley. Stepless changes in the transmission of power from the drive pulley shaft to the driven pulley shaft are accomplished by changing the effective diameter with which the belt actually wraps around each of the drive and the driven pulleys.

2. Description of Background Art

Japanese Patent Application Laid-Open Publication No. 2000-73724 discloses a power unit for a motorcycle equipped with a starter clutch that becomes in Clutch-On state once the revolution of the torque transmitted from the crankshaft to the drive pulley shaft of the continuously variable transmission exceeds a preset value. In a power unit for a four-wheel vehicle disclosed in Japanese Unexamined Patent Application Publication No. SHO63-103784, a plurality of clutches and a continuously variable transmission are housed in a transmission chamber. The switching between engagement and disengagement of each of the clutches is hydraulically controlled. In addition, the speed change performed by the continuously variable transmission is also hydraulically controlled.

The power unit as disclosed in Japanese Patent Application Laid-Open Publication No. 2000-73724 includes no other clutches other than the starter clutch. In this power unit with a configuration, for example, in which the starter clutch is provided on the drive pulley shaft, the load on the starter system can be reduced. When the vehicle is stopped, the starter clutch in the power unit is sometimes disengaged before the drive pulley and the driven pulley in the continuously variable transmission are allowed to have respective pulley groove widths corresponding to a low-speed state. In this case, next time the vehicle starts, the vehicle has to start with its continuously variable transmission being in a high-speed state.

On the other hand, the power unit disclosed in Japanese Unexamined Patent Application Publication No. SHO63-103784 includes a plurality of clutches, and the switching between the engagement and disengagement of each clutch is hydraulically controlled. The larger the number of oil passages becomes, the more complex the configuration of oil passages becomes. Consequently, the formation of oil passages needs special consideration.

SUMMARY AND OBJECTS OF THE INVENTION

The present invention is made under such circumstances. An object of an embodiment of the present invention is to provide a power unit for a motorcycle. In the power unit, the load that is charged on the starter system when the internal combustion engine starts can be reduced. In addition, when the internal combustion engine is stopped, the continuously variable transmission is made to be in a state corresponding to the low-speed state. Moreover, the power unit has a simplified configuration of oil passages, and thus the formation of oil passages no longer needs special consideration.

To accomplish the above-mentioned object of an embodiment of the present invention, a power unit for a motorcycle is provided that is equipped with a continuously variable transmission including a drive pulley provided on a drive pulley shaft, to which the torque is transmitted from a crankshaft. A driven pulley is provided on a driven pulley shaft with an axis that is parallel to the drive pulley shaft with a belt looped between the drive pulley and the driven pulley. The continuously variable transmission is housed in a transmission chamber within an engine body. The continuously variable transmission steplessly changes the power transmitted from the drive pulley shaft to the driven pulley shaft by changing the effective diameter with which the belt actually wraps around each of the drive pulley and the driven pulley. The power unit also includes an input clutch, which is set between the crankshaft and the drive pulley shaft, and which is provided on the drive pulley shaft and a starter clutch, which is set between the driven pulley shaft and a rear wheel, and which is provided on the driven pulley shaft. The switching between the engagement and disengagement of a first one of the input clutch and the starter clutch is hydraulically controlled, and the switching between the engagement and disengagement of a second one of the input clutch and the starter clutch is mechanically controlled.

According to an embodiment of the present invention, among the input clutch and the starter clutch, the first one with the hydraulically-controlled switching between the engagement and disengagement is housed in the transmission chamber. Among the input clutch and the starter clutch, the second one with the mechanically-controlled switching between the engagement and disengagement is disposed outside of the transmission chamber.

According to an embodiment of the present invention, the power unit further includes hydraulic drive mechanisms respectively annexed to the drive pulley and the driven pulley so as to change the respective pulley groove widths.

According to an embodiment of the present invention, the first one of the input clutch and the starter clutch, which one is housed in the transmission chamber, is provided on a first one of the drive pulley shaft and the driven pulley shaft. The first one of the clutches is disposed, in the axial direction of the drive pulley shaft and of the driven pulley shaft, at the opposite side of the continuously variable transmission from the hydraulic drive mechanism annexed to the corresponding one of the drive pulley and the driven pulley, which one is provided on a second one of the drive pulley shaft and the driven pulley shaft.

According to an embodiment of the present invention, the input clutch and the starter clutch are arranged so as to partially overlap each other on a projection drawing on a plane orthogonal to the axes of the drive pulley shaft and of the driven pulley shaft.

According to an embodiment of the present invention, the input clutch disposed outside of the transmission chamber is mechanically linked and interlocked with a side stand so that the switching between the engagement and disengagement of the input clutch can be interlocked with the operation of the side stand.

According to the embodiments of the present invention, the input clutch, which is set between the crankshaft and the drive pulley shaft, is provided on the drive pulley shaft while the starter clutch, which is set between the driven pulley shaft and a rear wheel, is provided on the driven pulley shaft. Consequently, when the internal combustion engine is started, the transmission of power to the continuously variable transmission side can be discontinued. As a result, the load charged on the starter system when the internal combustion engine is started can be reduced. Thus, the starter system can be made more compact in dimension. In addition, even with a disconnection of the starter clutch that occurs when the internal combustion engine is stopped, the torque from the crankshaft can be transmitted to the continuously variable transmission via the input clutch. Thus, the continuously variable transmission can be shifted from a higher-speed state to a lower-speed state. Consequently, the continuously variable transmission is prevented from remaining in a higher-speed state at the next occasion of starting the motorcycle. Moreover, the switching between the engagement and the disengagement of one of the input clutch and the starter clutch is hydraulically controlled while the switching between the engagement and the disengagement of the other one of the input clutch and the starter clutch is mechanically controlled. Consequently, the number of necessary oil passages is prevented from becoming large, and a simple structure of the oil passages can be accomplished. Thus, the formation of oil passages no longer needs special consideration.

According to an embodiment of the invention, in particular, more flexibility in design can be accomplished. When all the clutches are hydraulically controlled, less flexibility is allowed in designing the arrangement of the clutches. The arrangement of the mechanically-switchable clutch outside the transmission chamber allows a more flexible design. The arrangement of one of the input clutch and the starter clutch outside the transmission chamber allows the transmission chamber to be made more compact in dimension. The clutch, disposed outside the transmission chamber, can be designed so as to have a larger diameter and to be more compact in dimension in the axial direction without affecting the dimension of the transmission chamber. In addition, the diameter of the clutch disposed outside the transmission chamber can be made not to be limited by the pulley shafts inside the transmission chamber. Consequently, the diameter of the clutch can be selected more flexibly, so that the clutch can be made more compact in the axial direction. The compact clutch, together with the compact transmission chamber, can contribute to the accomplishment of a more compact power unit.

According to an embodiment of the invention, in particular, the clutch which is housed in the transmission chamber, and which is provided on a first one of the drive and the driven pulley shafts is disposed at the opposite side of the continuously variable transmission from the hydraulic drive mechanism annexed to a pulley provided on a second one of the drive pulley shaft and of the driven pulley shafts. Consequently, the clutch housed in the transmission chamber, can have as large a diameter as to get close to the second one of the drive and the driven pulley shafts. Thus, the diameter of the clutch can be selected more flexible.

According to an embodiment of the invention, in particular, the input clutch and the starter clutch are arranged so as to partially overlap each other when viewed in the axial direction. Consequently, the two clutches can have larger diameters, and can be made more compact in the axial direction. Moreover, the distance between the drive pulley shaft and the driven pulley shaft can be made narrower, so that the power unit can be made more compact.

According to an embodiment of the invention, in particular, the input clutch is linked and interlocked with the side stand. Consequently, the power transmission from the crankshaft to the continuously variable transmission is prevented from occurring while the side stand is in use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, modes for carrying out the present invention will be described using embodiments of the present invention illustrated in accompanying drawings.

Figure 1:
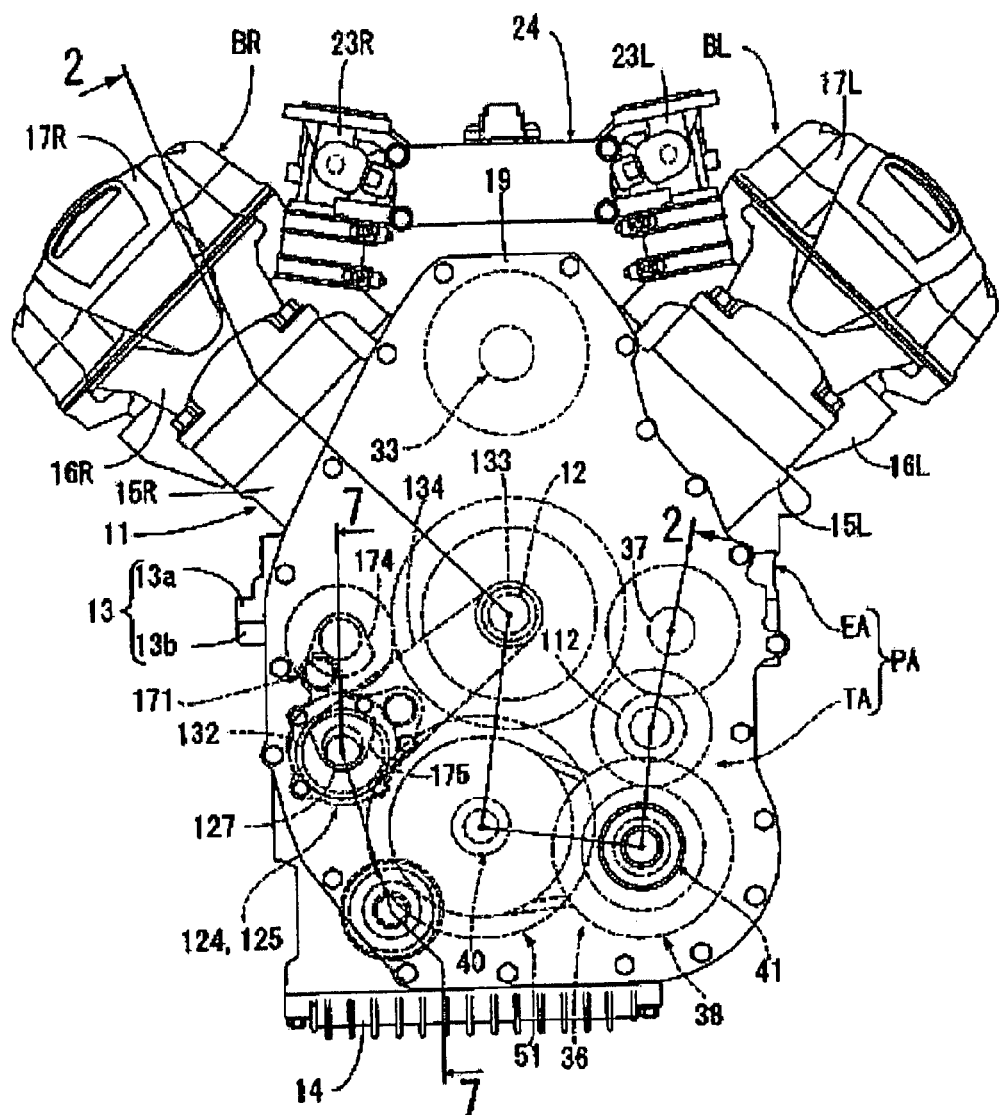
FIG. 1 is a front side view of a power unit of a first embodiment.

As illustrated in FIG. 1, a power unit PA is mounted on a motorcycle or a motor tricycle, and includes a V-type four-cylinder internal combustion engine EA and a power transmission system TA. The power transmission system TA transmits, as a changing and reducing of the speed, a driving power generated in the internal combustion engine EA to a rear wheel (not illustrated), which is a drive wheel.

Figure 2:
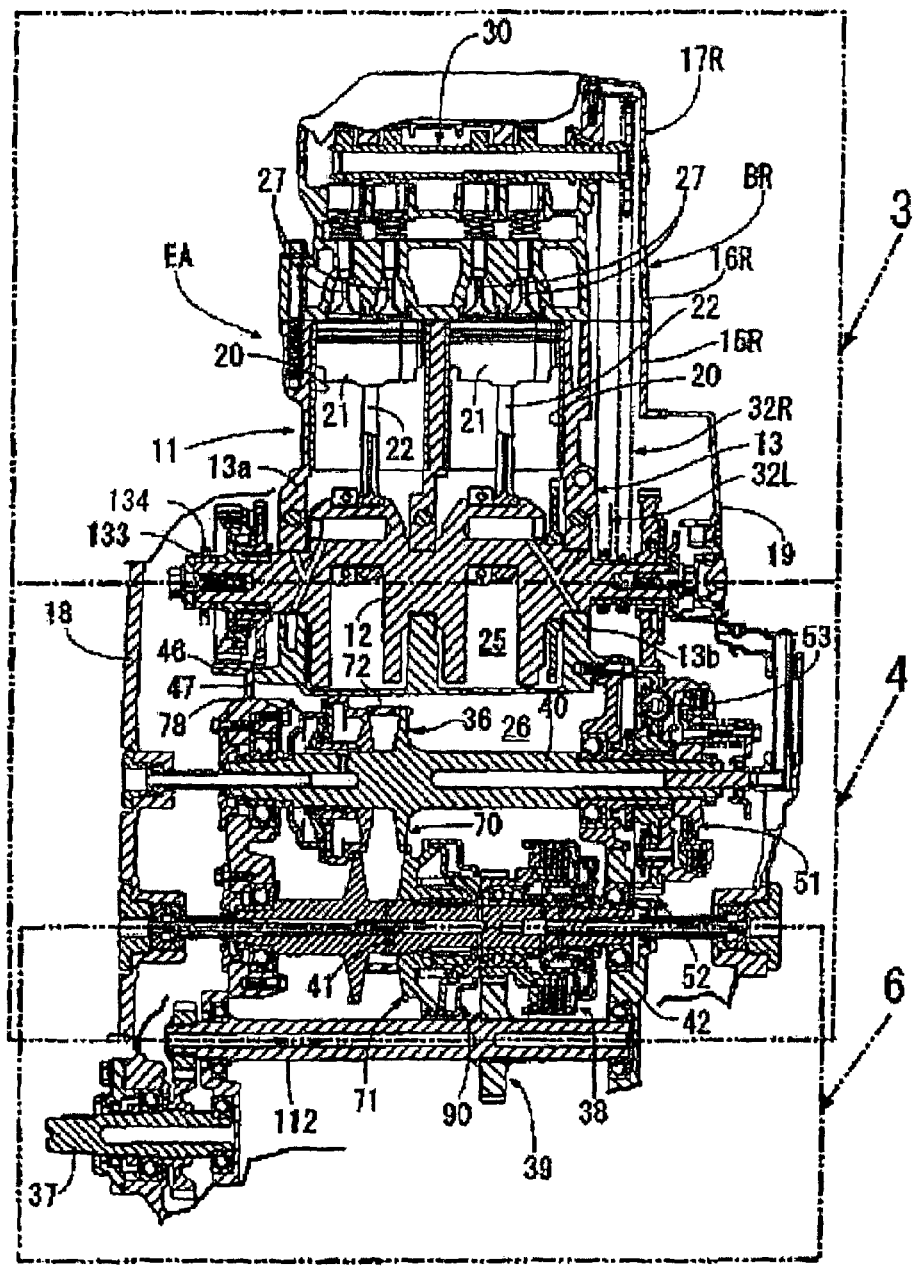
FIG. 2 is a cross-sectional view taken along the line 2-2 in FIG. 1.

As illustrated in FIG. 2, an engine body 11 of the internal combustion engine EA includes a crankcase 13, which rotatably supports a crankshaft 12 extending in the front-to-rear direction of the motorcycle. The engine body 11 also includes a right-side and a left-side banks BR, BL, which are respectively formed, into a V-shape, contiguously on the right-side and the left-side upper portions of the crankcase 13. The engine body 11 also includes an oil pan 14, joined to the bottom of the crankcase 13.

The crankcase 13 is formed by joining an upper case-half 13a and a lower case-half 13b to each other. The crankshaft 12 is rotatably supported between the joint surfaces respectively of the upper case-half 13*a* and the lower case-half 13*b*.

The right-side bank BR includes a right-side cylinder block 15R formed integrally with the upper case-half 13*a*. Also included are a right-side cylinder head 16R joined to the right-side cylinder block 15R, and a right-side head cover 17R joined to the right-side cylinder head 16R. The left-side bank BL, on the other hand, includes a left-side cylinder block 15L formed integrally with the upper case-half 13*a*. Also included are a left-side cylinder head 16L joined to the left-side cylinder block 15L, and a left-side head cover 17L joined to the left-side cylinder head 16L.

A rear cover 18 covers the lower portion of the engine body 11 from the rear in the traveling direction of the motorcycle while a front cover 19 covers the lower portion of the engine body 11 from the front in the traveling direction. The rear cover 18 is joined to the right-side cylinder block 15R, the left-side cylinder block 15L, and a crankcase 13. Meanwhile, the upper portion of the front cover 19, which extends out to reach the lower portion between the right-side and of the left-side banks BR, BL, is joined to the right-side cylinder block 15R, the left-side cylinder block 15L, and a crankcase 13.

Figure 3:
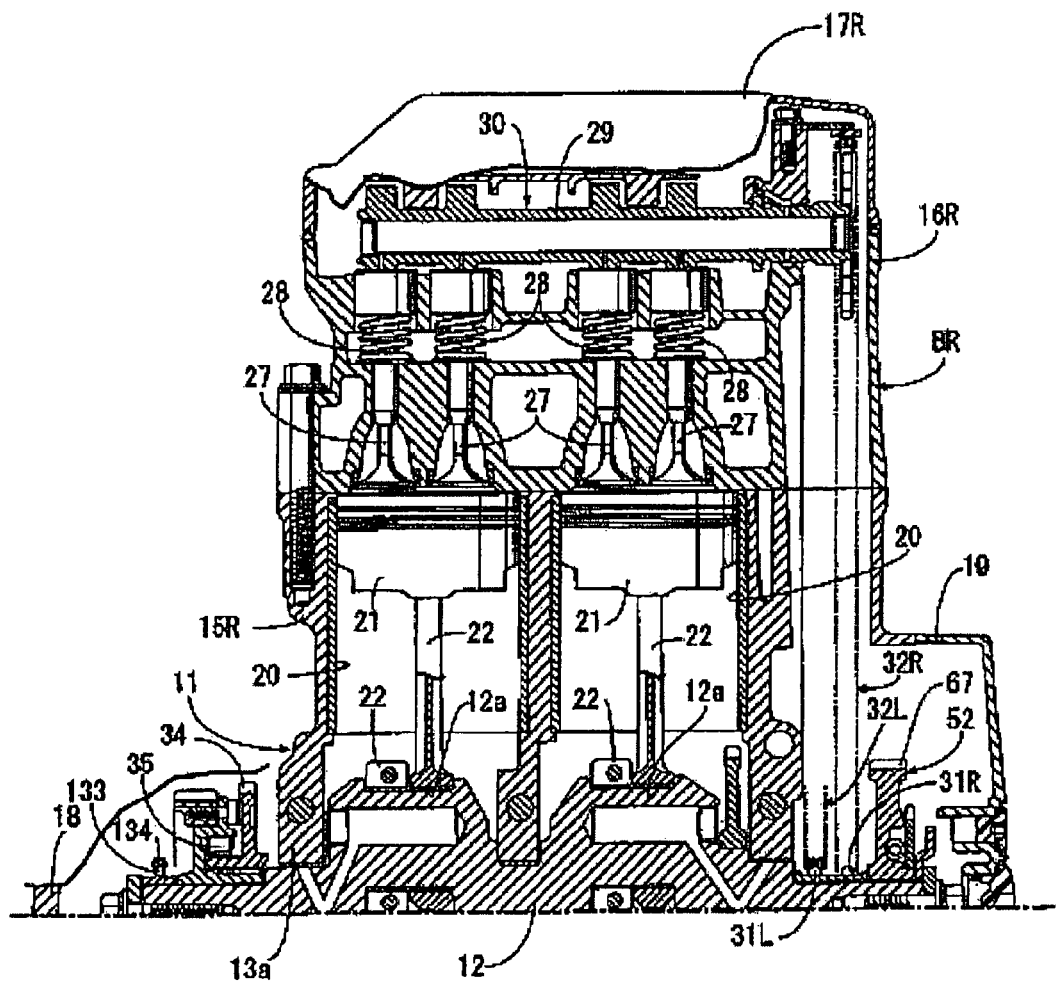
FIG. 3 is an enlarged view of a part indicated by the arrow 3 in FIG. 2.

As illustrated in FIG. 3, a pair of cylinder bores 20, 20 are formed in each of the right-side and the left-side cylinder blocks 15R and 15L. The pairs of the cylinder bores 20, 20 are offset from each other in the axial direction of the crankshaft 12. Pistons 21, 21 are slidably fitted into respective cylinder bores 20, 20 and are connected, with respective connecting rods 22, 22, to respective crank pins 12*a*, 12*a*.

As FIG. 1 shows, an intake system 24 is disposed between the two banks BR, BL, and includes throttle bodies 23R and 23L. The throttle bodies 23R are joined to the right-side cylinder head 16R, and correspond individually to the cylinders of the right-side bank BR. The throttle bodies 23L are joined to the left-side cylinder head 16L, and correspond individually to the cylinders of the left-side bank BL.

Intake valves 27, 27 are disposed in the right-side and the left-side cylinder heads 16R and 16L. A pair of the intake valves 27, 27 are disposed for each cylinder so as to be capable of being opened and closed. Valve springs 28, 28 are provided to bias the respective intake valves 27, 27 to a direction such as to close the intake valves 27, 27. Exhaust valves (not illustrated) are also disposed in the right-side and the left-side cylinder heads 16R and 16L. A pair of the exhaust valves, which are capable of being opened and closed, are disposed for each cylinder, and are biased to a direction such as to close the valves. Intake valves 27 and exhaust valves are opened and closed by respective valve systems 30, which include intake-side cam shafts 29 and exhaust-side cam shafts (not illustrated). The intake-side cam shafts 29 correspond to the intake valves while the exhaust side cam shafts correspond to the exhaust valves.

In a state where the power unit P is mounted on the motorcycle, a first end of the crankshaft 12 sticks out towards the front from the crankcase 13. A synchronizing transmission means 32R, including a drive sprocket 31R fixed onto the crankshaft 12, is provided between the portion of the crankshaft 12, which portion sticks out towards in a forward direction from the crankcase 13, and each one of the intake-side cam shaft 29 and the exhaust-side cam shaft of each valve system 30 in the right-side bank BR. A synchronizing transmission means 32L is provided between the crankshaft 12 and each one of the intake-side cam shafts 29 and of the exhaust side cam shafts of each valve system 30 of the left-side bank BL. These synchronizing transmission means 32R, 32L respectively transmit the torque from the crankshaft 12 to the intake-side cam shafts 29 and to the exhaust-side cam shafts while the speed of the transmitted torque is reduced by half.

In a state where the power unit PA is mounted on the motorcycle, a second end of the crankshaft 12 sticks out towards the rear from the crankcase 13. A driven gear 34 is fitted onto the second end portion of the crankshaft 12 so as to rotate relative to the crankshaft 12. A starter motor 33 is attached to the upper case-half 13*a* of the crankcase, precisely, at a position that is covered with the front cover 19 when the internal combustion engine EA is viewed from the front side (see FIG. 1). The driving power is transmitted from the starter motor 33 to the driven gear 34 via an unillustrated gear mechanism. A unidirectional clutch is provided between the driven gear 34 and the crankshaft 12 so as to allow the transmission of the driving power from the driven gear 34 to the side of the crankshaft 12.

Figure 4:
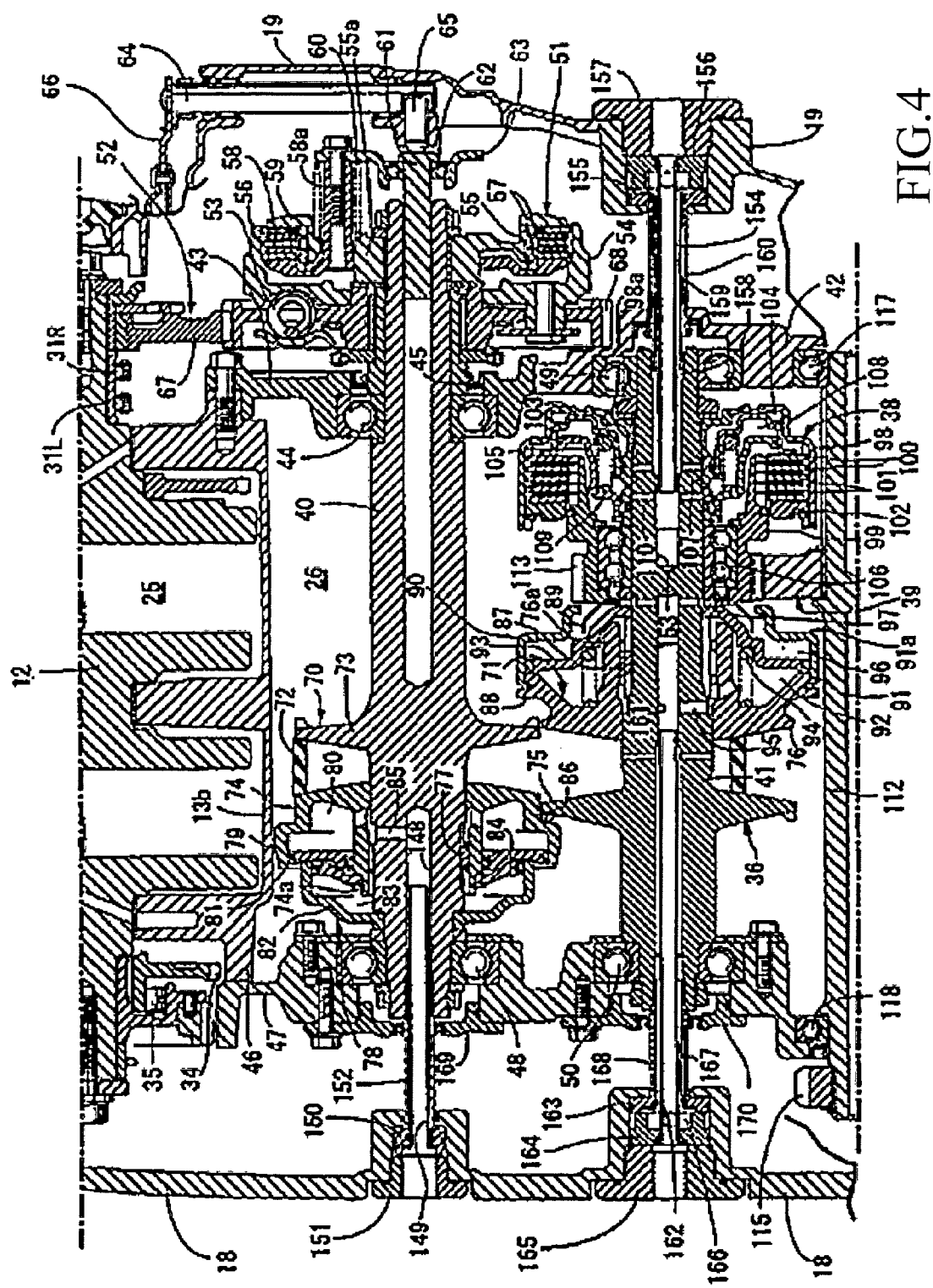
FIG. 4 is an enlarged view of a part indicated by the arrow 4 in FIG. 2.

As illustrated in FIG. 4, the power transmission system TA includes a belt-type continuously variable transmission 36, which accomplishes stepless changes in the speed of the driving power by use of hydraulic control. The power transmission system TA also includes an input clutch 51, which is set between the crankshaft 12 and the continuously variable transmission 36. The power transmission system TA, in addition, includes an output shaft 37, which sticks out rearward from the rear cover 18 so as to transmit the driving power to the unillustrated rear wheel. Moreover, included in the power transmission system TA are a starter clutch 38 and a gear transmission mechanism 39, which are provided between the continuously variable transmission 36 and the output shaft 37.

Inside the crankcase 13, a crank chamber 25 is formed to accommodate most of the crankshaft 12. In addition, a transmission chamber 26 is formed inside the engine body 11 so as to be positioned at the rear of the crank chamber 25. More specifically, inside the crankcase 13 the transmission chamber 26 is formed as being separated from the crank chamber 25 and below the crank chamber 25. In this event, a front support wall 43 fixed to a front side-wall 42 of the lower case-half 13*b* of the crankcase 13 serves as the front wall of the transmission chamber 26. A rear support wall 47 fixed to a rear side-wall 46 of the lower case-half 13*b* of the crankcase 13 serves as the rear wall of the transmission chamber 26.

The continuously variable transmission 36 is housed in the transmission chamber 26. Among the starter clutch 38 and the input clutch 51, one, precisely the starter clutch 38, is also housed in the transmission chamber 26. The other one of the starter clutch 38 and the input clutch 51, precisely the input clutch 51, is disposed outside the transmission chamber 26.

The continuously variable transmission 36 includes a drive pulley shaft 40 and a driven pulley shaft 41, which are parallel to the crankshaft 12, and which are placed below the axis of the crankshaft 12. A first end of the drive pulley shaft 40, then, rotatably penetrates a front support-wall 43. A ball bearing 44 and an oil seal 45, which is placed at an outer position than the ball bearing 44, are set between the front support-wall 43 and the drive pulley shaft 40. A second end of the drive pulley shaft 40, on the other hand, is rotatably supported by a rear support-wall 47. A ball bearing 48 is set between the rear support-wall 47 and the second end of the drive pulley shaft 40. A first end of the driven pulley shaft 41 is rotatably supported by the front side-wall 42 of the crankcase 13 with a ball bearing 49 set in between. A second end of the driven pulley shaft 41 is rotatably supported by the rear support-wall 47 with a ball bearing 50 set in between.

The input clutch 51, disposed outside the transmission chamber 26, mechanically switches between the connection and the disconnection. The input clutch 51 is put onto a shaft end of a first-end side of the drive pulley shaft 40, which shaft end sticks out from the front support-wall 43. The input clutch 51 includes a clutch outer 54 and a clutch inner 55. The driving power is transmitted from the crankshaft 12 via a primary reduction-gear mechanism 52 and a damper spring 53 to the clutch outer 54. The clutch inner 55 has a boss portion 55a. The boss portion 55a is placed in the center portion inside the clutch outer 54, and is coupled onto the drive pulley shaft 40 so as not to rotate relative to the drive pulley shaft 40. The input clutch 51 also includes a plurality of first drive clutch plates 56 and a plurality of first driven clutch plates 57. The plurality of first drive clutch plates 56 are splined to fit into the inner circumferential wall of the clutch outer 54, and are slidable in the axial direction. The plurality of first driven clutch plates 57 are splined to fit onto the outer circumferential wall of the clutch inner 55, and are slidable in the axial direction. The first drive and the first driven clutch plates 56 and 57 are stacked alternately with each other. In addition, the input clutch 51 includes a pressure plate 58, a pressure receiving plate 59, and a clutch spring 60. The pressure plate 58 is slidably supported by the boss portion 55a so as to face, from the inside, the first drive and the first driven clutch plates 56 and 57, which are stacked alternately with each other. The pressure receiving plate 59 is formed integrally with the clutch inner 55 so as to face, from the outside, the first drive and the first driven clutch plates 56 and 57, which are stacked alternately with each other. The clutch spring 60 biases the pressure plate 58 to the pressure-receiving-plate 59 side.

A linking shaft 58a is provided to the pressure plate 58. The linking shaft 58a extends in a direction along the axis of the drive pulley shaft 40, and penetrates the clutch inner 55 so as to move freely. A slide shaft 61 is coaxially and slidably fitted into a first end portion of the drive pulley shaft 40. A release member 63 is supported by the slide shaft 61 with a release bearing 62 set in between. The linking shaft 58a is fixed to the release member 63, and the clutch spring 60 is set, as being compressed, between the clutch inner 55 and the release member 63.

An operation shaft 64 is rotatably supported by the front cover 19, and switches the state of the input clutch 51 between connected and disconnected states. The front cover also holds a push rod 65, which is slidable and which determines the position of the release member 62 in accordance with the rotational movement of the operation shaft 64. An end portion of the operation shaft 64 sticks out from the front cover 19, and a clutch lever 66 is provided to the sticking-out end portion.

A rotational movement of the clutch lever 66 pushes the push rod 65, and thus the pressure plate 58 is moved towards the back against the spring force of the clutch spring 60. Consequently, the first drive clutch plates 56 and the first driven clutch plates 57 are in a released state. Accordingly, the input clutch 51 is in the clutch-off state with the clutch outer 54 and the clutch inner 55 being disconnected from each other.

Figure 5:
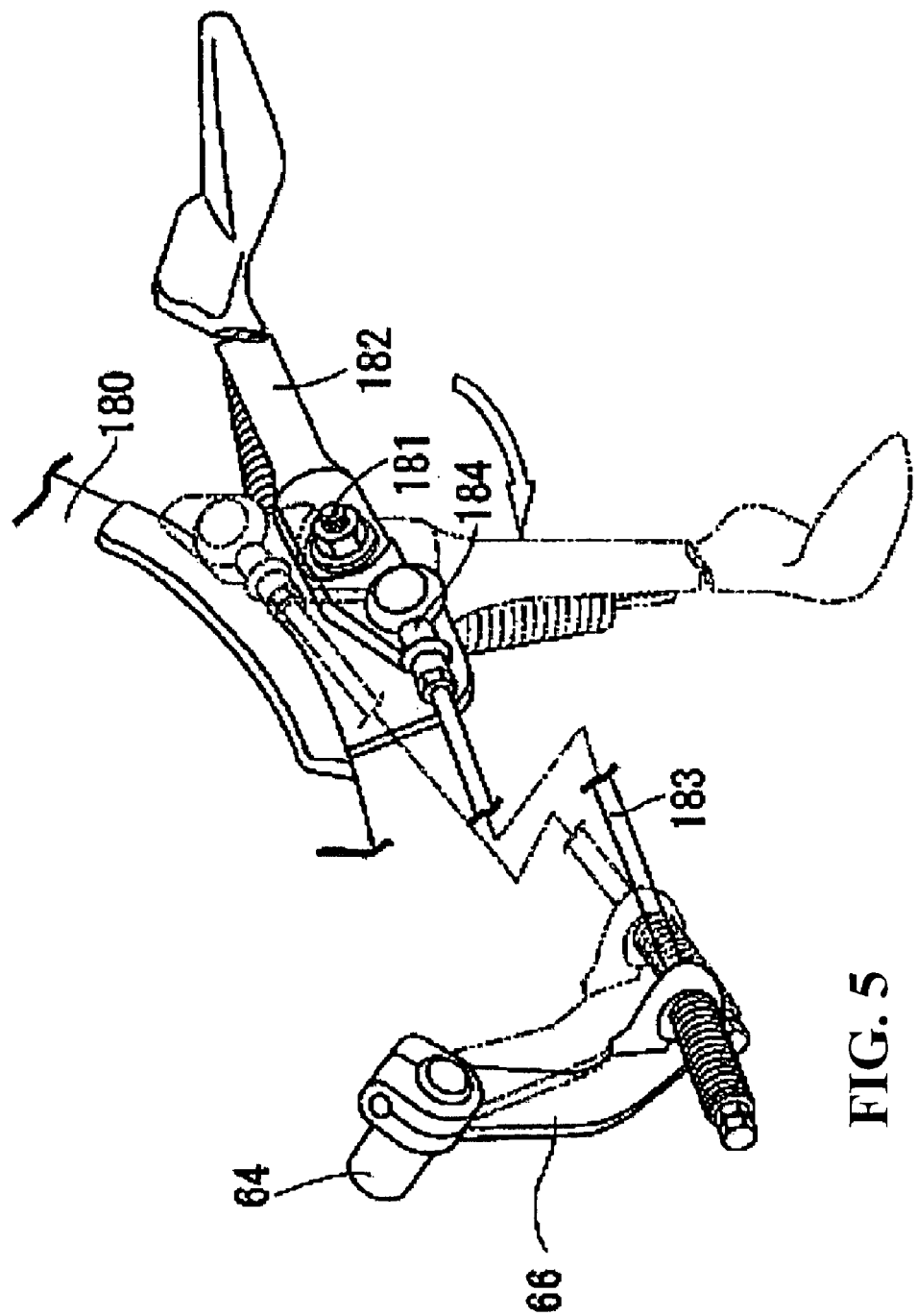
FIG. 5 is a perspective view showing linking and interlocking relations between a side stand and an input clutch.

As illustrated in FIG. 5, a side stand 182 is supported by a body frame 180 of the motorcycle with a pivot shaft 181, so as to be movable rotationally. The clutch lever 66 is connected to the side stand 182 via a wire, or a link rod 183 and a joint 184. In response to the rotational movement of the side stand 182 to take a standing position, indicated by the two-dot chain line in FIG. 5, the clutch lever 66 and the operation shaft 64 move rotationally to push the push rod 65. Thus, the input clutch 51 comes to be in the disengaged state. In contrast, when the side stand 182 moves rotationally to the retracted position, indicated by the solid line in FIG. 5, the clutch lever 66 and the operation shaft 64 moves rotationally in the opposite direction to the direction mentioned above. Thus, the push rod 65 is pushed by the clutch spring towards a side so as to move away from the input clutch 51. As a result, the input clutch comes to be in the power-transmitting state. To put it another way, the input clutch 51 is mechanically interlocked and linked with the side stand 182 so as to make the switching between the connection and the disconnection of the input clutch 51 be interlocked with the operation of the side stand 182. For this reason, as long as the side stand 182 is in the standing state, there is no transmission of the driving power from the crankshaft 12 to the continuously variable transmission 36.

To the first end side of the drive pulley shaft 40, the torque from the crankshaft 12 is transmitted via the primary reduction-gear mechanism 52, the damper spring 53 and the input clutch 51. The first reduction-gear mechanism 52, which transmits the torque from the crankshaft 12 to the drive-pulley-shaft 40 side while reducing the speed of the torque, includes a primary drive gear 67 provided on the crankshaft 12, a primary driven gear 68, which meshes with the primary drive gear 67. As FIG. 3 clearly shows, the primary drive gear 67 is provided on the crankshaft 12 at the outer side of the drive sprocket 31R. The primary driven gear 68 is supported by the drive pulley shaft 40 so as to rotate relative to the drive pulley shaft 40, and is connected to the clutch outer 54 of the input clutch 51 with the damper spring 53 set in between.

The continuously variable transmission 36 includes a drive pulley 70 provided on the drive pulley shaft 40, a driven pulley 71 provided on the driven pulley shaft 41, and an endless V-belt 72, which is looped between the drive and the driven pulleys 70 and 71. The drive pulley 70 is composed of a drive-side fixed pulley-half 73, which is formed integrally with the drive pulley shaft 40, and a drive-side movable pulley-half 74, which is opposed to the drive-side fixed pulley-half 73. The drive-side movable pulley-half 74, which is supported by the drive pulley shaft 40, is not rotatable relative to the drive pulley shaft 40, but is slidable in the axial direction. The driven pulley 71 is composed of a driven-side fixed pulley-half 75, which is formed integrally with the driven pulley shaft 41, and a driven-side movable pulley-half 76, which is opposed to the driven-side fixed pulley-half 75. The driven-side movable pulley-half 76, which is supported by the driven shaft 40, is not rotatable relative to the driven pulley shaft 41, but is slidable in the axial direction.

The V-belt 72 is looped between the drive and the driven pulleys 70 and 71. The relative positions of the drive-side and the driven-side movable pulley-halves 74, 76 respectively to the drive-side and the driven-side movable pulley-halves 73, 75 are hydraulically controlled to change the effective diameters with which the V-belt actually wraps around each of the drive and the driven pulleys 70 and 71. Accordingly, the speed of the drive power transmitted from the drive pulley shaft 40 to the driven pulley shaft 41 is steplessly changed.

The drive-side movable pulley-half 74 is arranged at a position opposed to the drive-side fixed pulley-half 73 from a side opposite to the side where the front support-wall 43 is located. A first boss portion 74a is formed integrally with and contiguously to the inner circumferential portion of the drive-side movable pulley-half 74, and coaxially surrounds the drive pulley shaft 40. A key 77 is set between the first boss portion 74a and the drive pulley shaft 40. A drive-side hydraulic drive mechanism 78 for slidingly driving the drive-side movable pulley-half 74, is disposed on the drive pulley shaft 40 at the opposite side of the drive-side movable pulley-half 74 from the drive-side fixed pulley half 73.

The drive-side hydraulic drive mechanism 78 includes a first case member 79, a first end plate 81, a fixed cup-shaped body 82, and a second end plate 84. The cylindrical first case member 79, which surrounds coaxially the first boss portion 74a, is formed integrally with and contiguously to the outer circumferential portion of the drive-side movable pulley-half 74, and extends to the opposite side from the drive-side fixed pulley-half 73. The ring-plate-shaped first end plate 81 is slidingly in contact liquid-tightly with the inner circumference of the first case portion 79 and the outer circumference of the first boss portion 74a. Accordingly a first hydraulic chamber 80 is formed between the first end plate 81 and the drive-side movable pulley-half 74. The fixed cup-shaped body 82 is fixed on the drive pulley shaft 40 at the opposite side of the drive-side movable pulley-half 74 from the drive-side fixed pulley-half 73. The leading end portion of the fixed cup-shaped body 82 is brought into contact with the first end plate 81. The second end plate 84 is slidingly in contact liquid-tightly with the inner circumference of the fixed cup-shaped body 82. The inner circumference portion of the second end plate 84 is fixed to the first boss portion 74a. Accordingly, a second hydraulic chamber 83 is formed between the second end plate 84 and the fixed cup-shaped body 82.

In addition, a first oil hole 85, which communicates with the first and the second hydraulic chambers 80, 83, is formed in the drive pulley shaft 40. The drive-side movable pulley-half 74 is biased by a hydraulic force corresponding to the hydraulic pressure applied to the first and the second hydraulic chambers 80, 83. The drive-side movable pulley-half 74 is biased to a side as approaching the drive-side fixed pulley-half 73 so as to accomplish a larger effective diameter with which the V-belt 72 is wrapped around the drive pulley 70.

The driven-side fixed pulley-half 75 is formed integrally with the driven pulley shaft 41 at a position corresponding to the drive-side movable pulley-half 74 of the drive pulley 70. When viewed from a direction parallel to the axes of the drive and the driven shafts 40 and 41, the drive-side movable pulley-half 74 and the driven-side fixed pulley-half 75 are arranged as partially overlapping each other. A run-off concave portion 86 is formed in the outer circumference of the driven-side movable pulley half 74 to prevent the drive-side movable pulley-half 74 and the driven-side fixed pulley-half 75 from interfering with each other.

Figure 6:
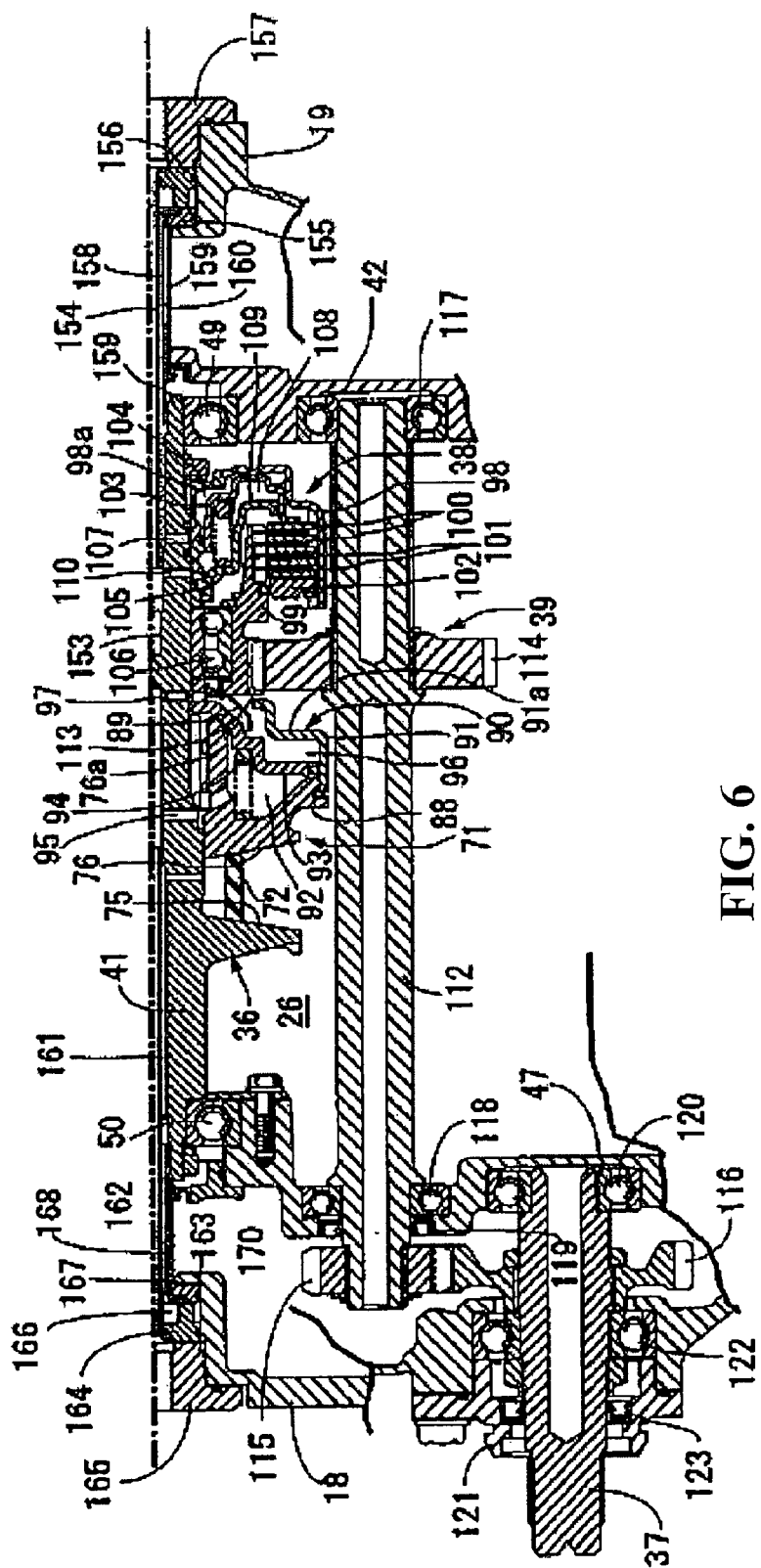
FIG. 6 is an enlarged view of a part indicated by the arrow 6 in FIG. 2.

As illustrated in FIG. 6, the driven-side movable pulley-half 76 is arranged at a position corresponding to the drive-side fixed pulley-half 73 of the drive pulley 70. A second boss portion 76a is formed, as coaxially surrounding the driven pulley shaft 41, integrally with and contiguously to the inner circumferential portion of the driven-side movable pulley-half 76. The second boss portion 76a extends to the side opposite from the side where the driven-side fixed pulley-half 75 is located. A key 87 is set between the second boss portion 76a and the driven pulley shaft 41. When viewed from a direction parallel to the axes of the drive and the driven shafts 40 and 41, the drive-side fixed pulley-half 73 and the driven-side movable pulley-half 76 are arranged as partially overlapping each other. A run-off concave portion 88 is formed in the outer circumference of the driven-side movable pulley half 76 to prevent the drive-side fixed pulley-half 73 and the driven-side movable pulley-half 76 from interfering with each other.

As described above, the run-off concave portion 86 to prevent the interference between the drive-side movable pulley-half 74 and the driven-side fixed pulley-half 75 is formed in the outer circumference of the drive-side movable pulley-half 74. In addition, the run-off concave portion 88 to prevent the interference between the drive-side fixed pulley-half 73 and the driven-side movable pulley-half 76 is formed in the outer circumference of the driven-side movable pulley-half 76. Consequently, the drive and the driven pulley shafts 40 and 41 can be disposed at positions closer to each other. As a result, a compact continuously variable transmission 36 is obtained.

A driven-side hydraulic drive mechanism 90 for slidingly driving the driven-side movable pulley-half 76, is disposed on the driven pulley shaft 41 at the opposite side of the driven-side movable pulley-half 76 from the driven-side fixed pulley half 75. The driven-side hydraulic drive mechanism 90 includes a case member 91, an end-wall member 93, and a coil spring 94. The cylindrical case member 91 coaxially surrounds the second boss portion 76a. The case member 91 has a first end fixed to the outer circumferential portion of the driven-side movable pulley-half 76, and extends to a side opposite to the side where the driven-side fixed pulley-half 75 is located. The end-wall member 93 is slidingly in contact liquid-tightly with the inner circumference of the case member 91. Accordingly, a third hydraulic chamber 92 is formed between the end-wall member 93 and the driven-side movable pulley-half 76. The inner circumferential portion of the end-wall member 93 is fixed to the driven pulley shaft 41. The coil spring 94 is set, as being compressed, between the driven-side movable pulley-half 76 and the end-wall member 93 so as to prevent the loosening of the V-belt 72, which may possibly occur when the internal combustion engine E is stopped.

In addition, a second oil hole 95, which communicates with the third hydraulic chamber 92, is formed in the driven pulley shaft 41. The driven-side movable pulley-half 76 is biased by a hydraulic force corresponding to the hydraulic pressure applied to the third hydraulic chamber 92. The drive-side movable pulley-half 76 is biased to a side as approaching the driven-side fixed pulley-half 75 so as to accomplish a larger effective diameter with which the V-belt 72 is wrapped around the driven pulley 71. A restriction plate member 91a is formed integrally with and contiguously to a second end of the case member 91 so as to stick out inward in the radial direction. The restriction plate member 91a, which is brought into contact with the end-wall member 93 from the opposite side of the end-wall member 93 from the driven-side fixed pulley-half 75, determines the limit to which the driven-side movable pulley-half 76 can get close to the driven-side fixed pulley-half 75.

An annular first canceller chamber 96 is formed between the end-wall member 93 and the restriction plate member 91a, and has an open inner circumference side. A first lubricant-oil passage 97 is formed in the driven pulley shaft 41 and the end-wall member 93 so as to guide the lubricant oil. A guide member 89 is fixed to the end-wall member 93 to guide the lubricant oil from the first lubricant-oil passage 97 to the first-canceller-chamber 96 side. When a centrifugal force acts on the oil of the third hydraulic chamber 92 with its pressure being lowered due to the rotation, a force to press the driven-side movable pulley-half 76 is generated. Even with generation of such a pressing force, another centrifugal force that similarly acts on the oil in the first canceller chamber 96 prevents the driven-side movable pulley 76 from moving, undesirably, to a side so as to get closer to the driven-side fixed pulley-half 75.

The starter clutch 38 provided on the driven pulley shaft 41 is disposed at the opposite side of the continuously variable transmission 36, in the axial direction of the drive and the driven pulley shafts 40 and 41, from the drive-side hydraulic drive mechanism 78, which is annexed to the drive pulley 70 provided onto the drive pulley shafts 40.

The starter clutch 38 is put onto the driven pulley shaft 41 between the driven pulley 71 and the rear support-wall 47 within the continuously variable transmission 36. The starter clutch 38 includes a clutch outer 98 and a clutch inner 99. The clutch outer 98 includes a cylindrical third boss portion 98a, which is joined to the driven pulley shaft 41 so as not to rotate relative to the driven pulley shaft 41. The clutch inner 99 is coaxially surrounded by the clutch outer 98, and is supported by the driven pulley shaft 41 with a ball bearing 106 set in between so as to freely rotate relative to the driven pulley shaft 41. The starter clutch 38 also includes a plurality of second drive clutch plates 100 and a plurality of second driven clutch plates 101. The plurality of second drive clutch plates 100 are engaged with the clutch outer 98 so as not to rotate relative to the clutch outer 98. The plurality of second driven clutch plates 101 are engaged with the clutch inner 99, so as not to rotate relative to the clutch inner 99. The second drive and the second driven clutch plates 100, 101 are stacked alternately with each other. In addition, the starter clutch 38 includes a pressure receiving plate 102, a piston 103 and a spring 105. The pressure receiving plate 102 is fixedly supported by the clutch outer 98 and faces the second drive and the second driven clutch plates 100, 101, which are stacked alternately with each other. The second drive and the second driven clutch plates 100, 101, are pressured between the pressure receiving plate 102 and the piston 103. A fourth hydraulic chamber 104 is formed between the clutch outer 98 and the piston 103. The spring 105 biases the piston 103 so as to reduce the volume of the fourth hydraulic chamber 104.

The outer circumferential portion and the inner circumferential portion of the piston 103 are slidingly in contact liquid-tightly with the clutch outer 98. In addition, a fourth oil hole 107 is formed in the driven pulley shaft 41, and communicates to the fourth hydraulic chamber 104. An increase in hydraulic pressure in the fourth hydraulic chamber 104 causes the piston 103 to operate so as to pressure the second drive and the second driven clutch plates 100, 101 between the piston 103 and the pressure receiving plate 102. Thus, the starter clutch 38 is in the connected state, in which the torque transmitted from the driven pulley shaft 41 to the clutch outer 98 is further transmitted to the clutch inner 99.

A second canceller chamber 108 is formed, at the opposite side of the piston 103 from the fourth hydraulic chamber 104, between the second canceller chamber 108 and a wall member 109. The inner circumferential portion of the wall member 109 is fixed to the boss portion 98a of the clutch outer 98. The piston 103 is slidingly in liquid-tightly contact with the outer circumferential portion of the wall member 109. In addition, the spring 105 is housed in the second canceller chamber 108, and set between the piston 103 and the wall member 109. Moreover, a second lubricant-oil passage 110 is formed in the third boss portion 98a of the clutch outer 98 and the wall member 109 so as to guide the lubricant oil. When a centrifugal force acts on the oil of the fourth hydraulic chamber 104 with its pressure being lowered due to the rotation, a force to press the piston 103 is generated. Even with generation of such a pressing force, another centrifugal force that similarly acts on the oil in the second canceller chamber 108 prevents the piston 103 from moving, undesirably, to a side so as to press the second drive and the second driven clutch plates 100, 101 between the piston 103 and the pressure-receiving plate 102.

In addition, the input clutch 51 and the starter clutch 38 are arranged so as to partially overlap each other on a projection drawing on a plane orthogonal to the axes of the drive and the driven pulley shafts 40 and 41.

The gear transmission mechanism 39 includes a single idle shaft 112, which has an axis parallel to the crankshaft 12, and which is arranged between the driven pulley shaft 41 and the output shaft 37. The gear transmission mechanism 39 also includes a first gear 113, a second gear 114, a third gear 115, and a fourth gear 116. The first gear 113 is formed integrally with the clutch inner 99 of the starter clutch 38. The second gear 114 meshes with the first gear 113 and is fixed on the idle shaft 112. The third gear 115 is also fixed on the idle shaft 112. The fourth gear 116 meshes with the third gear 115, and fixed on the output shaft 37. The gear transmission mechanism 39 is provided between the driven pulley shaft 41 and the output shaft 37 so as to make the driven pulley shaft 41 and the output shaft 37 rotate in the same direction.

A first end portion of the idle shaft 112 is rotatably supported by the front support-wall 43 with a ball bearing 117 set in between. A second end portion of the idle shaft 112 rotatably penetrates the rear support-wall 47. A ball bearing 118 and an oil seal 119 that is placed at the outer side of the ball bearing 118 are set between the rear support-wall 47 and the idle shaft 112.

A first end of the output shaft 37 is rotatably supported by the rear support-wall 47 with a ball bearing 120. A second end of the output shaft 37 rotatably penetrates the rear cover 18 and a cap 121, which is fastened to the rear cover 18 from the outer side of the rear cover 18. A ball bearing 122 is set between the rear cover 18 and the output shaft 37. An oil seal 123 is set between the cap 121 and the output shaft 37. The third gear 115 is arranged between the rear support-wall 47 and the rear cover 18, and is fixed on the second end portion of the idle shaft 112. The fourth gear 116 is fixed on the output shaft 37 between the rear support wall 47 and the rear cover 18.

Figure 7:
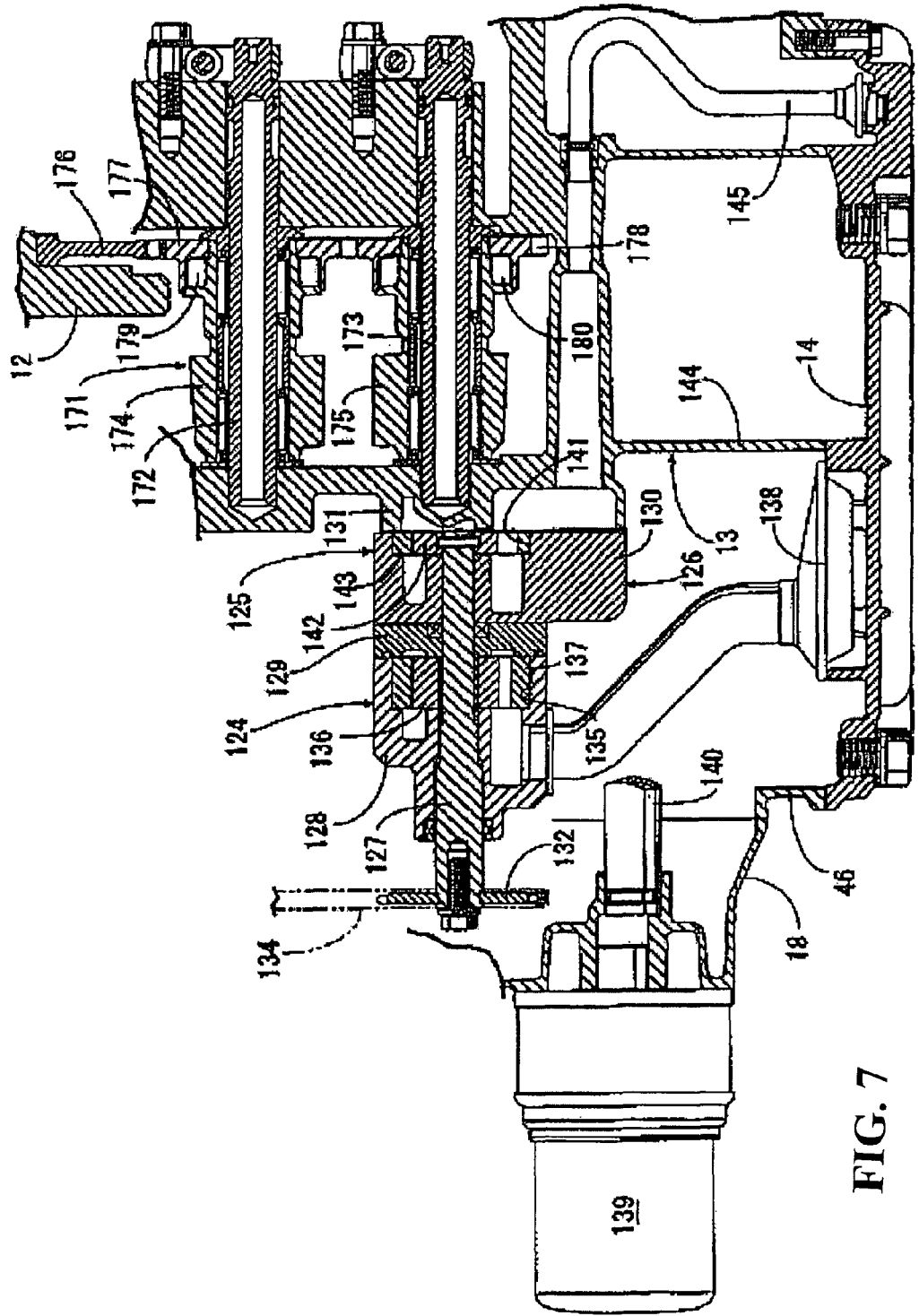
FIG. 7 is an enlarged cross-sectional view taken along the line 7-7 in FIG. 1.

As illustrated in FIG. 7, lubricant oil ejected from a first oil pump 124 is supplied to every part of the power unit PA that needs to be lubricated. The oil ejected from a second oil pump 125 is used for the purpose of at least the control of the gear shifting by, and the lubrication of, the continuously variable transmission 36. In this embodiment, the oil from the second oil pump 125 is used for both purposes. The first and the second oil pumps 124 and 125 share a common pump case 126 and a pump shaft 127, and arranged adjacent to each other in the axial direction between the rear cover 18 and the crankcase 13.

The pump case 126 is composed of a first, a second, and a third case members 128, 129, and 130, which are stacked in the axial direction and are fastened to a case portion 131 formed in the crankcase 13. The pump shaft 127 rotatably penetrates the first to the third case members 128 to 130, and is rotatably supported by the pump case 126. An end portion of the pump shaft 127 sticks out from the first case member 128, and a driven sprocket 132 is fixed on the end portion. An endless chain 134 is looped between the driven sprocket 132 and a drive sprocket 133, which is fixed on the second end portion of the crankshaft 12. The torque from the crankshaft 12 is transmitted to the pump shaft 127 via the drive sprocket 133, the chain 134 and the driven sprocket 132.

The first oil pump 124 is a trochoid-type pump, and includes a first pump chamber 135 formed between the first and the second case members 128 and 129. An inner rotor 136 fixed on the pump shaft 127 and an outer rotor 137, which meshes with the inner rotor 136, are housed in the first pump chamber 135. Oil is pumped up from the oil pan 14, passes through an oil strainer 138, and then reaches to the first pump chamber 135. The oil then passes through a tubular passage member 140, and is supplied to the oil filter 139 attached to the rear cover 18. The oil from the oil filter 139 is supplied to lubricate every part of the power unit PA that needs to be lubricated.

The second oil pump 125 is a trochoid-type pump, and includes a second pump chamber 141 formed between the third case member 130 and the case portion 131. An inner rotor 142 fixed on the pump shaft 127 and an outer rotor 143, which meshes with the inner rotor 142, are housed in the second pump chamber 141. In the crankcase 13, a bulkhead 144 is formed to separately pool the lubricant oil pumped up by the first oil pump 124 and the oil, which is different from the above-mentioned lubricant oil, for hydraulically controlling and lubricating the continuously variable transmission 36. The second oil pump 125 pumps up the oil for the hydraulic control and for the lubrication from the oil pan 14 through the suction pipe 145.

The hydraulic pressure of the oil that the second oil pump 125 is subjected to control performed by hydraulic pressure control valves (not illustrated), which correspond individually to the drive-side hydraulic drive mechanism 78 and the driven-side hydraulic drive mechanism 90. The oil thus controlled is supplied to the first and the second hydraulic chambers 80 and 83 in the drive-side hydraulic drive mechanism 78 and to the third hydraulic chamber 92 in the driven-side hydraulic drive mechanism 90. In addition, the oil is supplied to every part of the continuously variable transmission 36 that needs to be lubricated.

As illustrated in FIG. 4, a first center oil passage 148 is coaxially formed inside the second end side of the drive pulley shaft 40. The first center oil passage 148 has a closed end on the inner side, and communicates to the first oil hole 85. A cylindrical first pipe member 149 is liquid-tightly and coaxially inserted into the first center oil passage 148 from the rear-cover 18 side. An annular first pipe support member 150, which is liquid-tightly connected to the first pipe member 149, is liquid-tightly fitted to the rear cover 18 at a position corresponding to the drive pulley shaft 40. At the same position, a first connection member 151 is liquid-tightly screwed into the rear cover 18 so that the first pipe support member 150 can be held by and between the first connection member 151 and the rear cover 18. In addition, a tubular passage (not illustrated), which is connected to the first connection member 151, is connected to the hydraulic control valve corresponding to the drive-side hydraulic drive mechanism 78. A first tubular cover 152 surrounds coaxially the first pipe member 149 has a first end liquid-tightly penetrating a supporting member 169 fastened to the rear support-wall 47 at an outer side of the second end of the drive pulley shaft 40. The second end of the first tubular cover 152 is liquid-tightly joined to the rear cover 18.

As illustrated in FIGS. 4 and 5, a second center oil passage 153 is coaxially formed inside the first end side of the driven pulley shaft 41, and has a closed end on the inner side. A second pipe member 154, which communicates to the second lubricant oil passage 110, is liquid-tightly and coaxially inserted into the second center oil passage 153. A second pipe support member 155 and a third pipe support member 156, which is liquid-tightly connected to the second pipe member 154, are liquid-tightly fitted to the front cover 19 at a position corresponding to the driven pulley shaft 41, so that the second pipe support member 155 is held by and between the third pipe support member 156 and the front cover 19. At the same position, a second connection member 157, which communicates to the second pipe member 158 via the third pipe support member 156, is liquid-tightly screwed into the front cover 19 so that the second and the third pipe support members 155 and 156 can be held by and between the second connection member 157 and the front cover 19.

A third pipe member 159 coaxially surrounds the second pipe member 154, so that an annular oil passage 158 is formed in between. The annular oil passage 158 communicates to the fourth oil hole 107 while having no communication to the second lubricant oil passage 110. A first end of the third pipe member 159 is liquid-tightly inserted into the second center oil passage 153 while a second end of the third pipe member 159 is liquid-tightly joined to the third pipe support member 155. A second tubular cover 160 coaxially surrounds a third tubular member 159, and has its two ends joined respectively to the front side-wall 42 and the front cover 19 of the crankcase 13.

A third center oil passage 161 is coaxially formed inside the second end side of the driven pulley shaft 41, and has a closed end on the inner side. A fourth pipe member 162, which communicates to the second oil hole 95, is liquid-tightly and coaxially inserted into the third center oil passage 161. A fifth pipe support member 163 and a sixth pipe support member 164, which is liquid-tightly connected to the fourth pipe member 162, are liquid-tightly fitted to the rear cover 18 at a position corresponding to the driven pulley shaft 41, so that the fifth pipe support member 163 is held by and between the sixth pipe support member 164 and the rear cover 18. At the same position, a third connection member 165, which communicates to the fourth pipe member 162 via the sixth pipe support member 164, is liquid-tightly screwed into the rear cover 18 so that the fifth and the sixth pipe support members 163 and 164 can be held by and between the third connection member 165 and the rear cover 18.

In addition, a tubular passage (not illustrated), which is connected to the third connection member 165, is connected to the hydraulic control valve corresponding to the driven-side hydraulic drive mechanism 90. A fifth pipe member 167 coaxially surrounds the fourth pipe member 162, and is liquid-tightly joined to the fifth pipe support member 163. The fifth pipe member 167 is coaxially inserted into the third center oil passage 161 so that an annular oil passage 166 can be formed between the fourth and the fifth pipe members 162 and 167. The annular oil passage 166 communicates to the first lubricant oil passage 97, but has no communication to the second oil hole 95. A third tubular cover 168 coaxially surrounds the fifth pipe member 167. A first end of the third tubular cover 168 liquid-tightly penetrates a supporting member 170, which is fastened to the rear support-wall 47. A second end of the third tubular cover 168, on the other hand, is liquid-tightly joined to the rear cover 18.

Moreover, a balancer 171 is disposed at the opposite side of the crankshaft 12 from the output shaft 37. As FIG. 7 clearly shows, the balancer 171 is a two-shaft, secondary balancer. A first and a second balancer shafts 174 and 175 of the balancer 171 are arranged with a space in the vertical direction, and are rotatably supported respectively by a pair of pivot shafts 172 and 173. The first balancer shaft 174 is fitted into a driven gear 177, which meshes with a drive gear 176 fixed on the crankshaft 12, at a fitting portion 179. The second balancer shaft 175 is fitted into a driven gear 178, which meshes with the driven gear 177, at a fitting portion 180. The drive power transmitted from the crankshaft 12 rotates the first and the second balancer shafts 174 and 175.

Now, descriptions will be given as to some advantageous effects of the first embodiment. The input clutch is provided on the drive pulley shaft 40 as being set between the crankshaft 12 and the drive pulley shaft 40 while the starter clutch 38 is provided on the driven pulley shaft 41 as being set between the driven pulley shaft 41 and the rear wheel. Consequently, when the internal combustion engine EA starts, the power transmission to the continuously-variable-transmission 36 side can be discontinued. The load on the starter system at the time of starting the internal combustion engine EA can be reduced, and thus the starter system can be made smaller in dimension. In addition, even with a disconnection of the starter clutch 38 that occurs at the time of stopping the internal combustion engine EA, the torque from the crankshaft 12 can be transmitted to the continuously variable transmission 36 via the input clutch 51. Thus, the continuously variable transmission 36 can be shifted from a higher-speed state to a lower-speed state. Consequently, the continuously variable transmission 36 is prevented from remaining in a higher-speed state at the next occasion of starting the motorcycle.

The switching between the engagement and the disengagement of one of the input clutch 51 and the starter clutch, the starter clutch 38 in the first embodiment, is hydraulically controlled while the switching between the engagement and the disengagement of the other one of the input clutch 51 and the starter clutch, the input clutch 51 in the first embodiment, is mechanically controlled. Consequently, the number of necessary oil passages is prevented from becoming large, and a simple structure of the oil passages can be accomplished. Thus, the formation of oil passages no longer needs special consideration.

The mechanically-controlled input clutch 51 is disposed outside the transmission chamber 26. This allows a more flexible design. For example, when both the input clutch 51 and the starter clutch 38 are hydraulically controlled, less flexibility is allowed in designing the arrangement of the two clutches 51 and 38. The arrangement of the input clutch 51 outside the transmission chamber 26, and the mechanical switching control of the input clutch 51 allow a more flexible design. The arrangement of the input clutch 51 outside the transmission chamber 26 allows the transmission chamber 26 to be made more compact in dimension. The input clutch 51, disposed outside the transmission chamber 26, can be designed so as to have a larger diameter and to be more compact in dimension in the axial direction without affecting the dimension of the transmission chamber 26. In addition, the diameter of the input clutch 51 disposed outside the transmission chamber 26 can be made not to be limited by the pulley shafts 40, 41 inside the transmission chamber 26. Consequently, the diameter of the input clutch 51 can be selected from a wider range, so that the input clutch can be made more compact in the axial direction. The compact input clutch 51, together with the compact transmission chamber 26, can contribute to the accomplishment of a more compact power unit PA.

The starter clutch 38, on the other hand, is housed in the transmission chamber 26, and is provided on the driven pulley shaft 41. The starter clutch 38 is disposed at the opposite side of the continuously variable transmission 36 from the drive-side hydraulic drive mechanism 78, which is annexed to the drive pulley 70 provided on the drive pulley shaft 40. Consequently, the starter clutch 38, housed in the transmission chamber 26, can have as large a diameter as to get close to the drive pulley shaft 40. Thus, the diameter of the starter clutch can be selected from a wider range.

In addition, the input clutch 51 and the starter clutch 38 are arranged as partially overlapping each other when viewed in the axial direction. Consequently, the two clutches 51, 38 can have larger diameters, and can be made more compact in the axial direction. Moreover, the distance between the drive pulley shaft 40 and the driven pulley shaft 41 can be made narrower, so that the power unit PA can be made more compact.

In addition, the input clutch 51 is linked and interlocked with the side stand 182. Accordingly, power transmission from the crankshaft 12 to the continuously variable transmission 36 is prevented from occurring while the side stand 182 is in use.

In the description of the first embodiment, the side stand 182 is linked and interlocked with the clutch lever 66 of the input clutch 51. The clutch lever 66 may additionally be linked with a clutch-operation member provided to the steering handlebar by mechanical linking means such as a wire. Moreover, one of the side stand 182 and the clutch-operation member, both of which are linked to the clutch lever 66, may be made to serve to engage the input clutch 51, and the other one, to disengage the input clutch 51.

Figure 8:
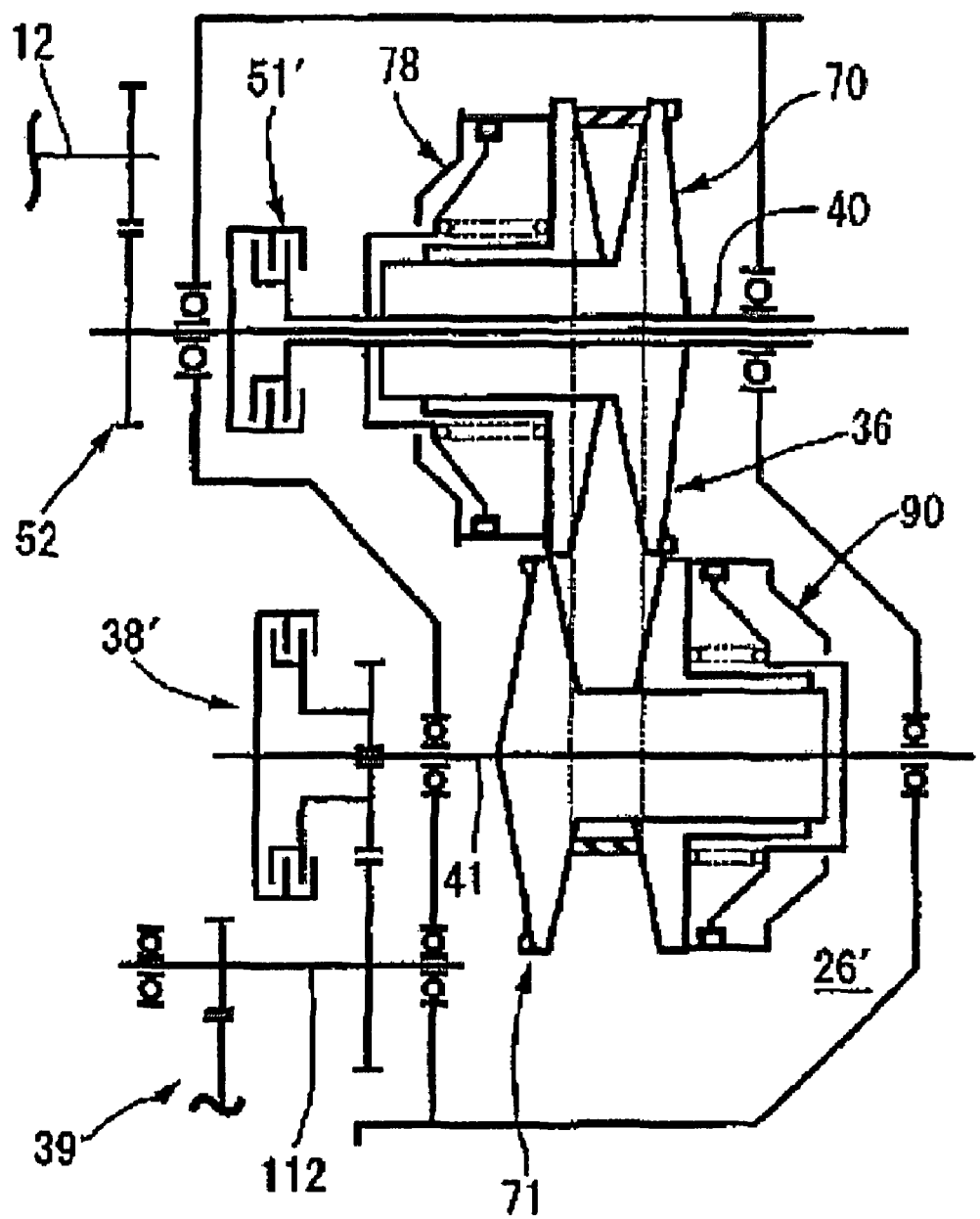
FIG. 8 is a simplified diagram illustrating a power transmission system of a second embodiment.

FIG. 8 shows a second embodiment of the present invention. An input clutch 51' switches between the connection of and the disconnection of the transmission of drive power from the crankshaft 12 to the drive pulley shaft 40 via the primary reduction-gear mechanism 52. The switching between the engagement and the disengagement of the input clutch 51' is controlled hydraulically, and the input clutch 51' is housed in a transmission chamber 26'. A starter clutch 38', on the other hand, is provided on the driven pulley shaft 41 and is set between the driven pulley 41 and the rear wheel. The switching between the engagement and the disengagement of the starter clutch 38' is controlled mechanically, and the starter clutch 38' is housed outside of the transmission chamber 26'.

In addition, the input clutch 51' is housed in the transmission chamber 26' and is provided on the drive pulley shaft 40, while the driven-side hydraulic drive mechanism 90 is annexed to the driven pulley 71 provided on the driven pulley shaft 41. The input clutch 51' is arranged at the opposite side of the continuously variable transmission 36 from the driven-side hydraulic drive mechanism 90 in the axial direction of the drive pulley shaft 40 and of the driven pulley shaft 41.

The second embodiment has similar effects to those provided in the first embodiment.

Figure 9:
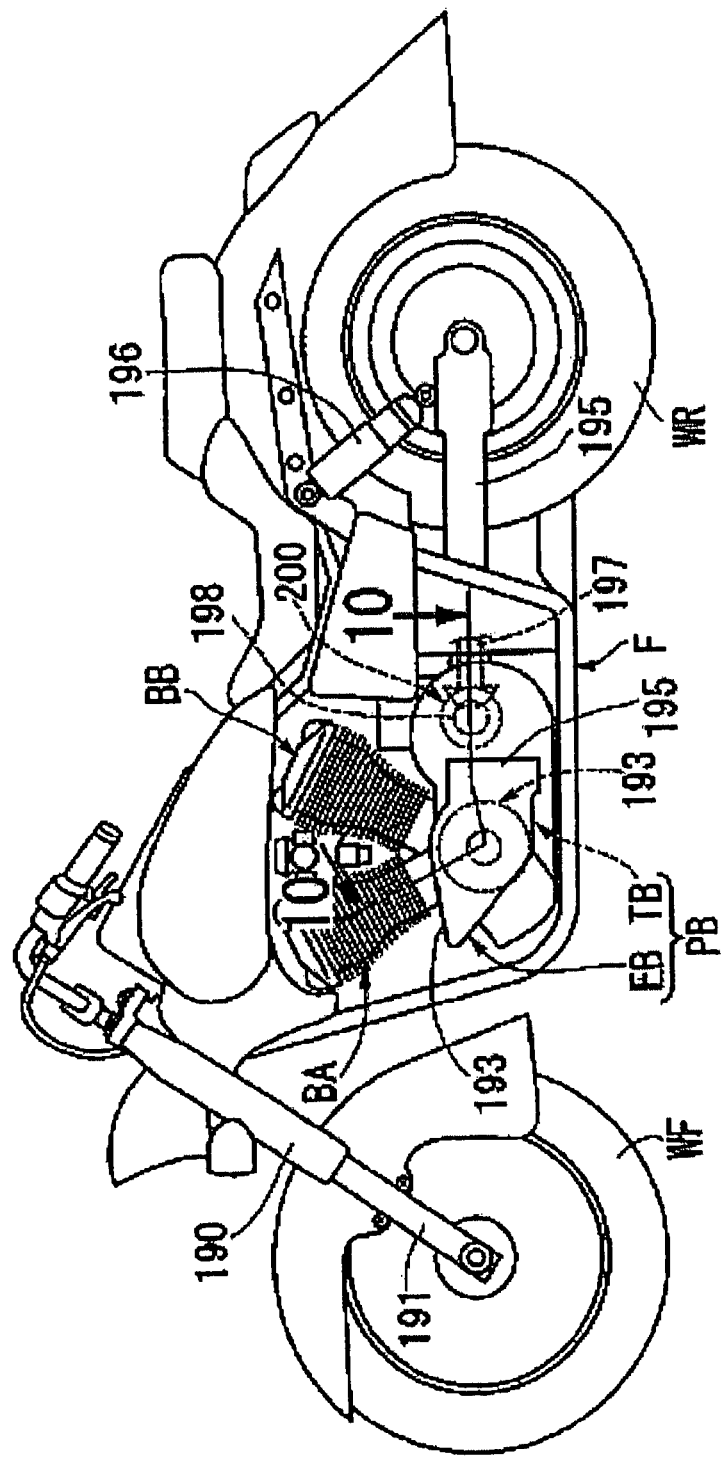
FIG. 9 is a left side view of a motorcycle of a third embodiment.
Figure 10:
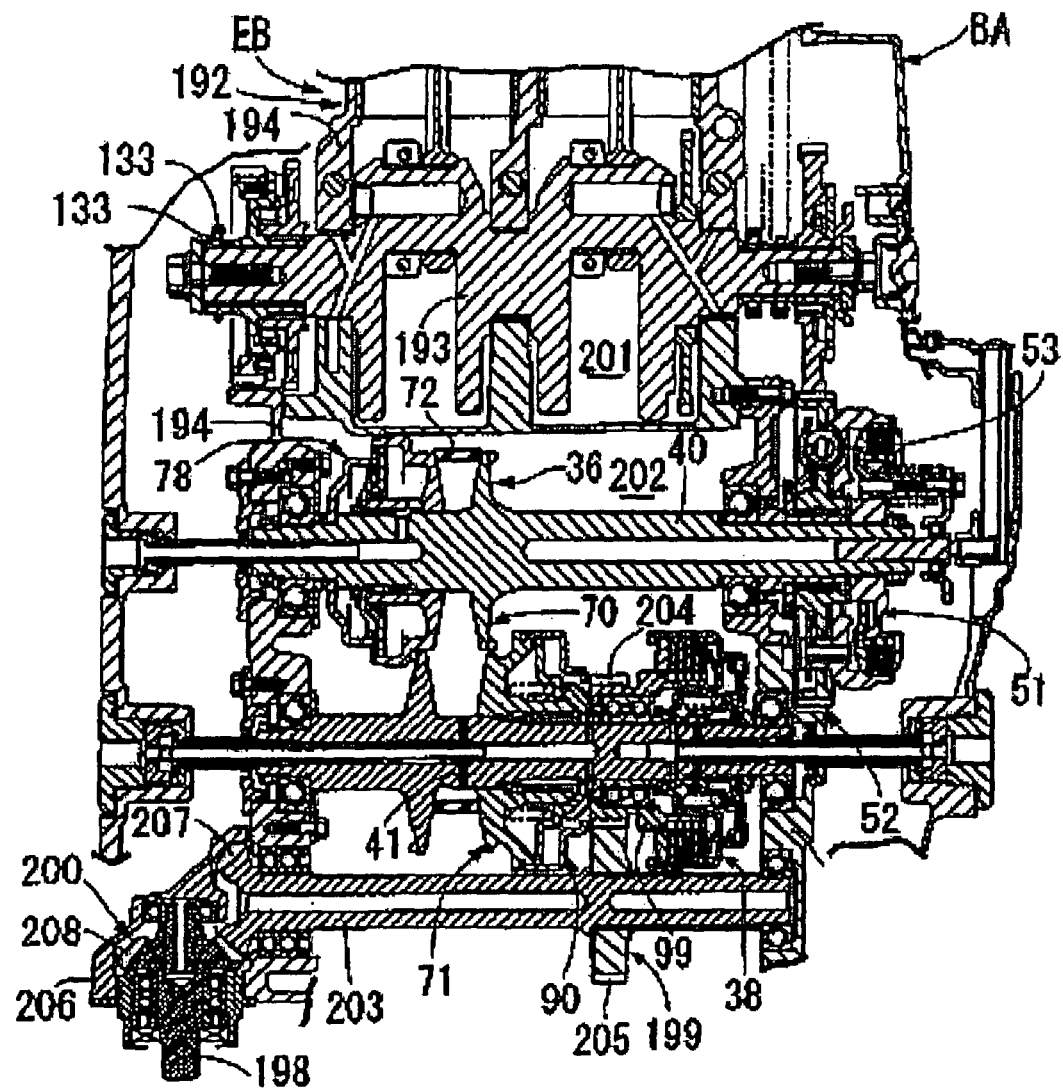
FIG. 10 is a cross-sectional view taken along the line 10-10 in FIG. 9.

FIGS. 9 and 10 show a third embodiment of the present invention.

Note that the component parts that respectively correspond to those in the first and the second embodiments are given the same reference numerals as those in the first and the second embodiments, and no detail descriptions of those parts will be given here.

In FIG. 9, a head pipe 190 is provided at the front end of a body frame F of the motorcycle steerably supports the front fork 191, which pivotally supports a front wheel WF. Between the front wheel WF and a rear wheel WR, a power unit PB is mounted on the body frame F. The power unit PB is composed of, for example, a V-type four-cylinder internal combustion engine EB and of a power transmission system TB. The power transmission system TB transmits the power from the internal combustion engine EB to the drive wheel, that is, the rear wheel WR, while reducing the speed of the transmitted power.

An engine body 192 of the internal combustion engine EB includes a crankcase 194, which rotatably supports a crankshaft 193 extending in the width direction of the motorcycle. The engine body 192 also includes a front-side and a rear-side banks BA, BB, which are respectively formed contiguously on the front-side and the rear-side upper portions of the crankcase 194. The front-side and the rear-side banks BA, BB are formed into a V-shape, by being disposed respectively in a front and a rear positions in the traveling direction of the motorcycle.

The front end portion of a swing arm 195 is swingably supported by the power unit PB while, at the rear end of the swing arm 195, the rear wheel WR is pivotally supported. A rear shock absorber unit 196 is provided between the swing arm 195 and the body frame F. The output of the power unit PB is transmitted to the rear-wheel WR side via a drive shaft 197 extending in the front-to-rear direction of the motorcycle.

As illustrated in FIG. 10, the power transmission system TB includes a belt-type continuously variable transmission 36, which accomplishes stepless changes in the speed of the drive power by use of hydraulic control. The power transmission system TB also includes an input clutch 51, which is set between the crankshaft 193 and the continuously variable transmission 36. The power transmission system TB, in addition, includes an output shaft 198, which sticks out towards the rear from a left-side rear portion of the crankcase 194 so as to be connected to the drive shaft 197. Moreover, included in the power transmission system TB are a starter clutch 38, a gear transmission mechanism 199, and a bevel gear mechanism 200, all of which are provided between the continuously variable transmission 36 and the output shaft 198.

Inside the crankcase 194, a crank chamber 201 is formed to accommodate most of the crankshaft 193. In addition, a transmission chamber 202, which is separated from the crank chamber 201, is formed inside the engine body 192 so as to be positioned at the rear of the crank chamber 201.

The continuously variable transmission 36 is housed in the transmission chamber 202. Among the starter clutch 38 and the input clutch 51, one, precisely the starter clutch 38, is also housed in the transmission chamber 202. The other one of the starter clutch 38 and the input clutch 51, precisely the input clutch 51, is disposed outside the transmission chamber 202.

The continuously variable transmission 36 has a similar configuration to the configuration in the first embodiment. The continuously variable transmission 36 includes a drive pulley shaft 40, which is parallel to the crankshaft 193, and a drive pulley 70 provided on the drive pulley shaft 40. A drive-side hydraulic drive mechanism 78 is annexed to the drive pulley 70. The continuously variable transmission 36 also includes a driven pulley shaft 41, which is parallel to the drive pulley shaft 40, and a driven pulley 71 provided on the driven pulley shaft 41. A driven-side hydraulic drive mechanism 90 is annexed to the driven pulley 71. On the other hand, the input clutch 51 is disposed outside of the transmission chamber 202, and the switching between the engagement and disengagement of the input clutch 51 is mechanically controlled. The torque from the crankshaft 193 is transmitted to a first end side of the drive pulley shaft 40 via a primary reduction-gear mechanism 52, a damper spring 53, and the input clutch 51.

The starter clutch 38 is provided on the driven pulley shaft 41, and the switching between the engagement and disengagement of the starter clutch 38 is hydraulically controlled. The starter clutch 38 is disposed at the opposite side of the continuously variable transmission mechanism 36 from the drive-side hydraulic drive mechanism 78 of the drive pulley 70 in the axial direction of the drive pulley 40 and of the driven pulley 41.

The gear transmission mechanism 199 is provided between the starter clutch 38 and an idle shaft 203, which has an axis parallel to the crankshaft 193, and which is rotatably supported by the crankcase 194. The gear transmission mechanism 199 includes a drive gear 204 and a driven gear 205. The drive gear 204 is formed integrally with a clutch inner 99 of the starter clutch 38. The driven gear 205, which meshes with the drive gear 204, is fixed on the idle shaft 203.

The bevel gear mechanism 200 is provided between an end portion of the idle shaft 203, which sticks out from a rear portion of the left side-wall of the crankcase 194, and the output shaft 198, which is rotatably supported by a gear case 206 attached to the crankcase 194. The bevel gear mechanism 200 includes a drive bevel gear 207 and a driven bevel gear 208. The drive bevel gear 207 is fixed on the end portion of the idle gear 203 inside the gear case 206. The driven bevel gear 208, which meshes with the drive bevel gear 207, is securely provided to the output shaft 198.

The third embodiment also has similar effects to those that the first embodiment has.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit for a motorcycle equipped with a continuously variable transmission including a drive pulley provided on a drive pulley shaft, to which a torque is transmitted from a crankshaft, a driven pulley provided on a driven pulley shaft with an axis that is parallel to the drive pulley shaft and a belt looped between the drive pulley and the driven pulley, the continuously variable transmission being housed in a transmission chamber within an engine body, and the continuously variable transmission changing steplessly the power transmitted from the drive pulley shaft to the driven pulley shaft by changing the effective diameter with which the belt actually wraps around each of the drive pulley and the driven pulley, the power unit comprising:

an input clutch set between the crankshaft and the drive pulley shaft and being provided on the drive pulley shaft; and a starter clutch set between the driven pulley shaft and a rear wheel and being provided on the driven pulley shaft;

wherein a switching between the engagement and disengagement of a first one of the input clutch and the starter clutch is hydraulically controlled, and a switching between the engagement and disengagement of a second one of the input clutch and the starter clutch is non-hydraulically controlled, wherein the continuously variable transmission includes a drive-side hydraulic drive mechanism and a driven-side hydraulic drive mechanism respectively annexed to the drive pulley and the driven pulley for changing a respective pulley groove width of the drive pulley and of the driven pulley, wherein the first one of the input clutch and the starter clutch is housed in the transmission chamber, wherein the first one of the input clutch and the starter clutch and a first one of the drive-side hydraulic drive mechanism and the driven-side hydraulic drive mechanism are disposed on a first one of the drive pulley shaft and the driven pulley shaft, wherein the second one of the input clutch and the starter clutch and a second one of the drive-side hydraulic drive mechanism and the driven-side hydraulic drive mechanism are disposed on a second one of the drive pulley shaft and the driven pulley shaft, wherein the drive-side hydraulic drive mechanism and the driven-side hydraulic drive mechanism are respectively located on opposites sides of the continuously variable transmission, and wherein the first one of the input clutch and the starter clutch and the second one of the drive-side hydraulic drive mechanism and the driven-side hydraulic drive mechanism are respectively located on the opposites sides of the continuously variable transmission.

2. The power unit for a motorcycle according to claim 1, wherein
the second one of the input clutch and the starter clutch is disposed outside of the transmission chamber.

3. The power unit for a motorcycle according to claim 1, wherein the input clutch and the starter clutch are arranged so as to partially overlap each other on a projection drawing on a plane orthogonal to the axes of the drive pulley shaft and of the driven pulley shaft.

4. The power unit for a motorcycle according to claim 2, wherein the second one of the input clutch and the starter clutch is the input clutch, and the input clutch is disposed outside of the transmission chamber, and is mechanically linked and interlocked with a side stand so that the switching between the engagement and disengagement of the input clutch is interlocked with an operation of the side stand.

5. A power unit adapted to be used with a motorcycle equipped with a continuously variable transmission including a drive pulley provided on a drive pulley shaft, to which torque is transmitted from a crankshaft, a driven pulley provided on a driven pulley shaft with an axis that is parallel to the drive pulley shaft and a belt looped between the drive pulley and the driven pulley, the continuously variable transmission being housed in a transmission chamber within an engine body, and the continuously variable transmission changing steplessly the power transmitted from the drive pulley shaft to the driven pulley shaft by changing the effective diameter with which the belt actually wraps around each of the drive pulley and the driven pulley, the power unit comprising:
an input clutch set operatively positioned between the crankshaft and the drive pulley shaft and being provided on the drive pulley shaft; and
a starter clutch set operatively positioned between the driven pulley shaft and a rear wheel and being provided on the driven pulley shaft;
wherein a switching between the engagement and disengagement of a first one of the input clutch and the starter clutch is hydraulically controlled, and a switching between the engagement and disengagement of a second one of the input clutch and the starter clutch is non-hydraulically controlled,
wherein the continuously variable transmission includes a drive-side hydraulic drive mechanism and a driven-side hydraulic drive mechanism respectively annexed to the drive pulley and the driven pulley for changing a respective pulley groove width of the drive pulley and of the driven pulley,
wherein the first one of the input clutch and the starter clutch is housed in the transmission chamber,
wherein the first one of the input clutch and the starter clutch and a first one of the drive-side hydraulic drive mechanism and the driven-side hydraulic drive mechanism are disposed on a first one of the drive pulley shaft and the driven pulley shaft,
wherein the second one of the input clutch and the starter clutch and a second one of the drive-side hydraulic drive mechanism and the driven-side hydraulic drive mechanism are disposed on a second one of the drive pulley shaft and the driven pulley shaft,
wherein the drive-side hydraulic drive mechanism and the driven-side hydraulic drive mechanism are respectively located on opposites sides of the continuously variable transmission, and
wherein the first one of the input clutch and the starter clutch and the second one of the drive-side hydraulic drive mechanism and the driven-side hydraulic drive mechanism are respectively located on the opposites sides of the continuously variable transmission.

6. The power unit adapted to be used with a motorcycle according to claim 5, wherein
the second one of the input clutch and the starter clutch is disposed outside of the transmission chamber.

7. The power unit adapted to be used with a motorcycle according to claim 5, wherein the input clutch and the starter clutch are arranged so as to partially overlap each other on a projection drawing on a plane orthogonal to the axes of the drive pulley shaft and of the driven pulley shaft.

8. The power unit adapted to be used with a motorcycle according to claim 5, wherein the second one of the input clutch and the starter clutch is the input clutch, and the input clutch is disposed outside of the transmission chamber, and is mechanically linked and interlocked with a side stand so that the switching between the engagement and disengagement of the input clutch is interlocked with an operation of the side stand.

9. A power unit adapted to be used with a motorcycle comprising:
a continuously variable transmission including a drive pulley provided on a drive pulley shaft, to which torque is transmitted from a crankshaft;
a driven pulley provided on a driven pulley shaft with an axis that is substantially parallel to the drive pulley shaft; and
a belt looped between the drive pulley and the driven pulley;
an input clutch set operatively positioned between the crankshaft and the drive pulley shaft and being provided on the drive pulley shaft; and
a starter clutch set operatively positioned between the driven pulley shaft and a rear wheel and being provided on the driven pulley shaft;
wherein a switching between the engagement and disengagement of a first one of the input clutch and the starter clutch is hydraulically controlled, and a switching between the engagement and disengagement of a second one of the input clutch and the starter clutch is non-hydraulically controlled,
wherein the continuously variable transmission includes a drive-side hydraulic drive mechanism and a driven-side hydraulic drive mechanism respectively annexed to the drive pulley and the driven pulley for changing a respective pulley groove width of the drive pulley and of the driven pulley,
wherein the first one of the input clutch and the starter clutch is housed in the transmission chamber,
wherein the first one of the input clutch and the starter clutch and a first one of the drive-side hydraulic drive mechanism and the driven-side hydraulic drive mechanism are disposed on a first one of the drive pulley shaft and the driven pulley shaft,
wherein the second one of the input clutch and the starter clutch and a second one of the drive-side hydraulic drive mechanism and the driven-side hydraulic drive mechanism are disposed on a second one of the drive pulley shaft and the driven pulley shaft, wherein the drive-side hydraulic drive mechanism and the driven-side hydraulic drive mechanism are respectively located on opposites sides of the continuously variable transmission, and wherein the first one of the input clutch and the starter clutch and the second one of the drive-side hydraulic drive mechanism and the driven-side hydraulic drive mechanism are respectively located on the opposites sides of the continuously variable transmission.

10. The power unit adapted to be used with a motorcycle according to claim 9, wherein the second one of the input clutch and the starter clutch is disposed outside of the transmission chamber.

11. The power unit adapted to be used with a motorcycle according to claim 9, wherein the input clutch and the starter clutch are arranged so as to partially overlap each other on a projection drawing on a plane orthogonal to the axes of the drive pulley shaft and of the driven pulley shaft.

12. The power unit adapted to be used with a motorcycle according to claim 9, wherein the second one of the input clutch and the starter clutch is the input clutch, and the input clutch is disposed outside of the transmission chamber, and is mechanically linked and interlocked with a side stand so that the switching between the engagement and disengagement of the input clutch is interlocked with the operation of the side stand.

* * * * *